(12) United States Patent
Klink et al.

(10) Patent No.: US 8,381,695 B2
(45) Date of Patent: Feb. 26, 2013

(54) WORKPIECE HAVING A TRIBOLOGICALLY USEABLE SURFACE AND METHOD FOR PRODUCING SUCH A SURFACE

(75) Inventors: Ulrich Klink, Neuffen (DE); Gerhard Flores, Ostfildern (DE); Tobias Abeln, Stuttgart (DE); Oliver Kull, Ostfildern (DE)

(73) Assignee: Maschinenfabrik Gehring GmbH & Co., Ostfildern (DE)

( * ) Notice: Subject to any disclaimer, the term of this patent is extended or adjusted under 35 U.S.C. 154(b) by 2902 days.

(21) Appl. No.: 10/191,203

(22) Filed: Jul. 9, 2002

(65) Prior Publication Data

US 2003/0021711 A1 Jan. 30, 2003

(30) Foreign Application Priority Data

Jul. 9, 2001 (EP) .................................. 01116558

(51) Int. Cl.
*F02F 1/20* (2006.01)
*F02F 1/00* (2006.01)
(52) U.S. Cl. ............... 123/193.2; 123/193.1; 29/888.06
(58) Field of Classification Search ............. 417/572; 59/4; 72/42, 700, 197; 428/600; 92/158, 92/159; 123/193 P, 670, 1 A, 193.2, 195 C, 123/668; 438/714; 216/75; 355/3; 279/106; 29/888.04, 888.042, 888.043
See application file for complete search history.

(56) References Cited

U.S. PATENT DOCUMENTS

| | | | | |
|---|---|---|---|---|
| 1,460,515 A | * | 7/1923 | Selker | 384/276 |
| 1,557,137 A | * | 10/1925 | Brincil | 384/284 |
| 1,746,020 A | | 2/1930 | Whiteley | |
| 1,882,956 A | | 10/1932 | Sandler | |
| 2,250,542 A | * | 7/1941 | Lodge | 72/185 |
| 3,545,831 A | * | 12/1970 | Denz et al. | 384/284 |
| 4,075,794 A | * | 2/1978 | Blaylock | 451/472 |
| 4,750,945 A | * | 6/1988 | Laslaz et al. | 148/512 |
| 5,697,206 A | | 12/1997 | Otani et al. | |
| 6,251,257 B1 | * | 6/2001 | Cochran | 205/640 |
| 6,328,026 B1 | * | 12/2001 | Wang et al. | 123/668 |
| 6,732,699 B2 | * | 5/2004 | Wakade et al. | 123/193.2 |

FOREIGN PATENT DOCUMENTS

| | | |
|---|---|---|
| DE | 19542892 C2 | 6/1997 |
| DE | 196 14 328 | 10/1997 |
| DE | 197 12 432 | 11/1997 |
| DE | 198 33 646 | 10/1999 |
| FR | 2 777 019 | 10/1999 |
| GB | 2 340 547 | 2/2000 |
| WO | 98/14710 | 4/1998 |

OTHER PUBLICATIONS

Klink U: et al.; "Laser Strukturieren von Zylinderlaufbahnen"; Lösungen aus Forschung und Industrie; Oct. 1999, Schriftenreihe des IWF, Vulkan Verlag, Essen, Germany.
M. Yoshinori; Patent Abstracts of Japan; No. 58207520; Japan; Dec. 3, 1983.

\* cited by examiner

*Primary Examiner* — Lindsay Low
(74) *Attorney, Agent, or Firm* — Gudrun E. Huckett (57) ABSTRACT

A workpiece has a tribologically useable surface formed as a sliding surface, lubricated by an intermediate material, for a counterpart movable relative to the workpiece in a direction of movement. The sliding surface is provided with a structure formed of a plurality of pockets. The pockets form a closed micropressure chamber delimited by the uninterrupted peripheral rim, respectively. The uninterrupted peripheral rim is a deburred structure edge. In a plan view, the pockets are elongate and have a longitudinal extension. The sliding surface has a functional roughness in the supporting areas between the pockets.

7 Claims, 5 Drawing Sheets

WORKPIECE HAVING A TRIBOLOGICALLY USEABLE SURFACE AND METHOD FOR PRODUCING SUCH A SURFACE

BACKGROUND OF THE INVENTION

1. Field of the Invention

The invention relates to a workpiece with a tribologically useable surface which is formed as a sliding surface or slide face lubricated by means of an intermediate material for a counterpart moving relative thereto, wherein the slide face is provided with a structure or texture comprised of a plurality of pockets. The invention further relates to a method for producing a tribologically useable surface, in particular, a piston sliding surface or piston slide face, of a cylinder.

2. Description of the Related Art

The piston slide face or piston sliding surface in internal combustion engines and the surfaces of greatly stressed slide bearings are embodied as tribologically useable surfaces. In this connection, it is important that under all operating conditions a sufficient lubrication is ensured by an oil film and the friction of the parts moving relative to one another is maintained at a minimal level.

WO 98/14710 describes a method for configuring workpiece surfaces of a bearing, wherein the supporting bearing surface is provided with micropores which have a depth between 2 µm and 10 µm. Such micropores are generated, for example, by laser beams.

The German patent document 198 33 646 C1 describes a cylinder sliding surface of a cylinder bore in an internal combustion engine; this sliding surface is provided by honing with a crossed scoring structure. In order to ensure in a simple way lubrication of the piston in the cylinder bore during motor operation in any movement phase, the sliding surface of the cylinder is provided with oil lubrication pockets. In the area of the upper dead center of a reciprocating piston guided in the cylinder bore as well as in the area of inlet/outlet bores provided in the sliding surface, these oil lubrication pockets overlie the crossed scoring structure. Accordingly, the oil lubrication pockets have a transition into one another.

In German patent document 196 14 328 A1, a method for coating and/or material-removing machining of pre-treated workpiece surfaces is described. In this method, a preparative surface treatment is provided in order to improve adhesion of the applied layer or the material-removing machining. Instead of conventional mechanical or electrochemical roughening of the workpiece surface known for this purpose, a treatment by laser beams is provided; this treatment provides the surface with a texture or structure of a regular pattern. The pattern can be optimally matched to the desired final treatment.

The British patent document 2 340 547 A discloses a cylinder for a diesel engine; the cylinder has pockets within the inner cylinder wall in the area of the upper dead center. These pockets are arranged in a staggered arrangement relative to one another in the axial direction as well as the circumferential direction.

SUMMARY OF THE INVENTION

It is an object of the present invention to provide a workpiece with a tribologically useable surface by which parts moved relative to one another have a reliable lubrication action as a result of a sufficient hydrodynamic pressure even under unfavorable operating conditions. Moreover, it is an object of the invention to provide a method for producing such a surface.

In accordance with the present invention, this is achieved in regard to the workpiece in that the pockets have an uninterrupted peripheral rim, wherein the peripheral rim is formed as a deburred structure edge, and form a closed micropressure chamber, respectively. The pockets, in a plan view, are elongate and have a longitudinal extension; the surface of the supporting areas between the pockets has a functional roughness. Moreover, in accordance with the present invention this is achieved in regard to the method by the following method steps: pre-treating; texturing by generating pockets; deburring of the structure edges; and finish-machining for producing a functional roughness on supporting areas between the pockets.

The invention can be realized by pockets of different shapes. It is important that the pockets are formed as peripherally or circumferentially closed micropressure chambers and that the pockets have an longitudinal extension in a plan view. The peripheral rim is formed as a deburred structure edge and the surface on the supporting areas between the pockets has a functional roughness. The functional roughness ensures the formation of a uniform lubrication film. In this connection, it is advantageous that a solid body contact is substantially prevented. In particular in areas of minimal relative speed, as in the area of the upper dead center of the piston, the deburred peripheral rim provides a uniform pressure build-up by displacement of lubricant from the pockets. In this connection, the texture or structure can be different in different sections of the surface, wherein in sections with minimal relative speed of the body to the workpiece the number and/or the size of the pockets is increased. In this connection, it is possible to graduate differently the depth and/or spacing of the pockets from one another, in particular, as a function of the relative speed of the counterpart. In this connection, the term functional roughness is to be understood as a surface texture or structure having projections and recesses (peaks and valleys) within a depth range greater than 0 µm and not more than 5 µm, usually 1 to 3 µm. This means that the roughness is minimal. A surface with such a roughness provides optimal conditions for lubrication of a sliding or running surface for a piston or any other moving part. Contact of the piston rings with the running or sliding surface is prevented by the lubrication film generated on such a surface.

Preferred pocket shapes are those which have a strip shape with substantially parallel lateral edges or are formed as acute triangles. As an alternative, other pocket shapes are also taken into consideration of which, for example, an oval shape and a diamond shape should be mentioned. In order to achieve an effect as great as possible of the hydrodynamic pressure, it is advantageous that the longitudinal extension (length) of the pockets is oriented substantially transverse to the movement direction of the counterpart. In this connection, one of the longitudinal directions of the pockets is slightly inclined relative to a line extending orthogonally relative to the movement direction. The incline angle between the orthogonal line and the longitudinal side is smaller than 1°, preferably between 0.1° and 0.7°.

It can also be expedient that the pocket bottom extends at an incline relative to a plane, formed by the supporting areas of the sliding surface, in the longitudinal direction of the pockets and parallel to the movement direction of the counterpart. The adhesion of the oil on the pocket walls or the bottom can be affected by the roughness of the pocket.

The method is defined by the processing steps and their sequence. It can be employed on a planar surface as well as on a curved surface. The method comprises the following main processing steps: a pre-treatment such as, for example, pre-honing; turning; pre-grinding; or milling; texturing, in particular, by laser treatment; electron beam processing; spark erosion; as well as finish-treatment in two steps, i.e., deburring and finish-machining. For deburring, brushes or deburring stones of a honing/deburring tool can be used, and the finish-machining can be realized, for example, by honing, grinding, or polishing. A pre-treatment is carried out in order to provide the tribological surfaces with their geometric precision. Care must be taken that the roughness of the pre-treatment before texturing is less than the desired structure depth. Otherwise, no significant contrast between the textured or structured areas and the areas of the supporting surface and no closed pressure chambers would result. The working step of pre-treatment is carried out with a defined cutting edge, for example, by fine drilling, milling and the like, or with an undefined cutting edge geometry, for example, pre-honing or grinding.

The closed pockets can be formed by laser radiation, electron beam, electroerosion or with mechanical methods such as knurling or milling. The shape dimensions, spacing, and orientation of the pockets depends on the tribological condition of the system; this will be explained infra in more detail.

The finish-treatment is carried out so that the fused projections on the edges of the micropressure chambers are removed by deburring and the surface between the pockets is treated to the desired roughness which, in general, requires smoothing, but also roughing in some cases. This treatment is carried out by fine-machining processes such as honing, polishing or grinding; this after-treatment is necessary because the height of the fused projections on the edges of the micropressure chambers is higher than the final roughness, the so-called functional roughness, of the functional (supporting) surfaces between the pockets. The lubrication gap width at which complete hydrodynamic lubrication is already possible is minimized with decreasing roughness.

The deburring of the structure edges can be carried out on a honing machine, for example, by arranging a double advancing device thereon. This double advancing device operates electromechanically/hydraulically. In the first phase for deburring, an electromechanical advancing action (feed) is used; in the second advancing phase for finish-machining a hydraulic advancing action (feed) is used. In this connection, the first set of honing stones, comprising deburring stones, is advanced electromechanically. The deburring stones have a short length corresponding to the length of the textured or structured section and the employed stroke movement is selected such that the method step deburring is carried out only in the textured area. In this connection, the configuration of the deburring stones can be matched completely to this coarse material-removing process. The degree to which this deburring action is carried out can be carried out with a preset duration or as a function of the number of stroke movements. Instead of a double advancing tool with deburring stones and smoothing stones, a honing tool with suitable deburring stones can also be provided on a separate spindle. In this connection, the stones are loaded only with low pressures in order to maintain the surface pressure on the projecting burrs at a low level. Deburring can also be performed with brushes or tools with defined cutting geometry.

The stones for finish-machining can be divided into individual stone sections which are supported independently from one another in a springy fashion. In this connection, six to eight stone sections per stone are considered to be expedient; this configuration enables as a result of the minimal length of the stone sections an adaptation of the abrasive coating to the waviness of the surface to be machined. In this way, a uniform roughness of the surface is achieved.

The closed micropressure chambers and the configuration of the transitions from the pockets to the supporting surface provide the suitable tribological structure which can generate a hydrodynamic pressure in an effective way. In addition to the closed micropressure chambers, further conditions for the generation of a hydrodynamic lubrication are to be seen in the relative speeds of the counterpart and the sliding surface, a sufficient lubricant quantity between the sliding surfaces, and the normal force between sliding surface and counterpart. The ratio of the structured surface relative to the non-structured surface is an important parameter for generating the hydrodynamic lubrication. With increasing speed a decreasing pocket surface proportion is required, which means that at reduced speed a great structure density and at great speeds a reduced texture or structure density is required. This relation enables a graduated configuration of the structure or texture, i.e., a structure or texture that changes gradually. This can be expedient when the speed along the sliding surface of the counterpart is not constant. This is the case particularly for reciprocating piston engines. Accordingly, the spacing of the pockets from one another can be decreased with increasing piston speed. This means that in the top dead center area a high pocket density and with increasing distance from the upper dead center a reduced pocket density is possible.

DESCRIPTION OF THE PREFERRED EMBODIMENTS

Figure 1:
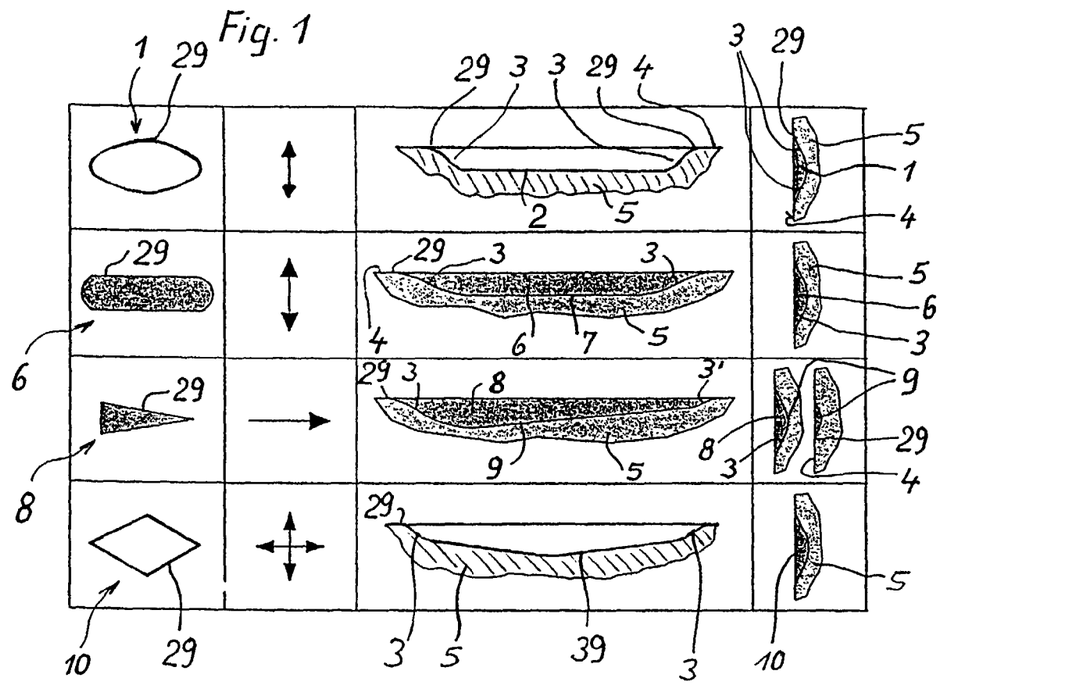
FIG. 1 is an illustration of different pocket shapes in longitudinal section and cross-section.

FIG. 1 shows different embodiments of pockets wherein in the left column a plan view of the pockets, in the adjacent column the movement direction of the counterpart, adjacent thereto the longitudinal section of the pockets, and all the way to the right the cross-section of the pockets are illustrated. According to the illustration, the pocket 1, which is oval in a plan view, has in longitudinal section and in cross-section a bottom 2 with rounded transitions 3 into a supporting surface 4 of the workpiece 5, for example, a cylinder. At the outwardly positioned end of the rounded transitions 3 a closed peripheral rim 29 is formed which surrounds the surface contour completely. The peripheral rim 29 is formed as a deburred structure edge. As a result of the oval shape of the pocket 1, the build-up of the hydrodynamic pressure takes place preferably in the movement direction of the counterpart transverse to the longitudinal axis of the pocket.

FIG. 1 also shows a pocket 6 which in a plan view has the shape of an elongate strip with parallel lateral edges. According to the longitudinal section the pocket 6 has a planar bottom 7 which has rounded transitions 3 passing into to the supporting surface 4 at its ends, respectively. In cross-section, illustrated in the drawing in the right column, the pocket 6 has also rounded transitions 3. As indicated by the arrows in the second column, for this pocket shape the preferred movement direction is substantially orthogonal to the longitudinal extension of the pocket 6. In this embodiment, there is also a closed peripheral rim 29 provided.

Moreover, in FIG. 1 a pocket 8 in the form of a pointed or acute triangle is illustrated. For this pocket 8, the movement direction is to be oriented preferably in the direction toward the tip. As illustrated in the longitudinal section, the pocket 8 has a bottom 9 which is preferably inclined relative to the plane defined by the supporting surface 4. The incline is such that the bottom 9 ascends toward the tip of the triangle shape. On both ends of the longitudinal extension, the pocket 8 has rounded transitions 3, 3'; however, the transitions 3, 3' are different because of the different depths of the pocket 8 at the two ends. The cross-sectional shape of the pocket 8 is illustrated in two planes wherein a section in the area with the greatest pocket depth and a section near the pointed end are illustrated. Rounded transitions are also provided. The closed peripheral rim 29 surrounds the surface contour.

As a further embodiment, a pocket 10 is illustrated in FIG. 1 which in a plan view has a diamond shape. The preferred movement direction extends in the direction of the longitudinal axis and the transverse axis, respectively. The longitudinal section of the pocket 10 shows the contour of its bottom 39 ascending slightly from the center in the direction to the ends; the contour of the pocket bottom 39 has rounded transitions passing into the supporting surface 4. With this extension of the contour of the bottom 39, the pocket 10 has two preferred movement directions of the counterpart.

The longitudinal configuration and cross-sectional configuration of the illustrated embodiments have rounded transitions 3 passing from the bottom 2, 7, 9, or 39 of the pocket 1, 6, 8 or 10 into the supporting areas 4 in the running direction of the counterpart. The pockets 1, 6, 8, 10 have longitudinal sides and/or a longitudinal center axis. The surface configuration of the pocket 1, 6, 8 or 10 depends of the movement direction of the counterpart.

Figure 2:
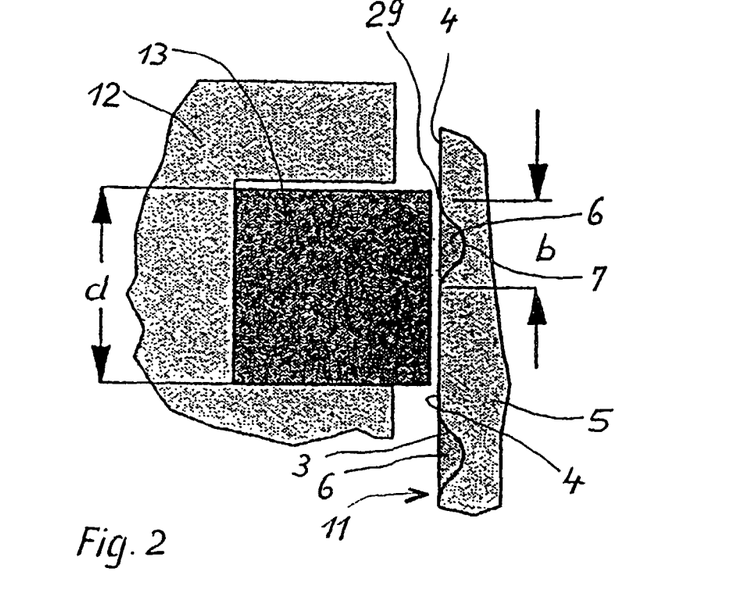
FIG. 2 shows an enlarged view of a detail of a piston slide face or piston sliding surface and a piston provided with a piston ring.

FIG. 2 shows a detail of a piston slide face or piston sliding surface 11 in a workpiece 5 as well as a piston 12 with a piston ring 13. On the piston slide face or piston sliding surface 11 pockets 6 are provided which have preferably the configuration of the pockets 6 in FIG. 1 and in cross-section have rounded transitions 3 into the supporting surfaces 4. For the purpose of generating hydrodynamic pressure, the width b of the pocket 6 is significantly smaller than the thickness d of the piston ring 13. For example, the thickness d is 30 times the width b of the pocket 6, or even greater. The piston slide face or piston sliding surface 11 has expediently a functional roughness on the supporting areas between the pockets 6.

The width, length, and depth of a pocket are determined by the tribological conditions. The width of a pocket is to be sized such that it is always substantially smaller than the uninterrupted length of the covering body (counterpart). One example is the pocket width in the upper dead center area of a piston slide face or piston sliding surface illustrated in FIG. 2. In this connection, the structure or texture of the piston sliding surface has a pocket of a width up to 60 µm wherein the thickness d of the piston rings is approximately 1.75 mm. The depth of the pocket determines the tribologically relevant lubrication volume. The pocket volume should always be smaller than the available lubricant volume. Both volumes are to be defined as $mm^3$ or $cm^3$ per surface area.

For reducing the volume of the lubricant, the depth of the pocket is preferably minimized. With regard to tribological consideration, approximately 10 µm would be sufficient for generating a complete hydrodynamic lubrication for a piston in a cylinder. However, when taking into consideration the long term wear to be expected despite tribological optimization, the pockets are to be designed with a depth of approximately 20 µm to 35 µm. As already described in connection with FIG. 2, it is therefore conceivable to have pocket depths of 60 µm. According to the speed in relation to the textural density, the structure can be of a uniform arrangement but can change gradually in the direction of depth in accordance with the speed. The volume per surface area proportion of the sliding surface should be relatively large in the area of the upper dead center because of the relative speed going toward zero and should be reduced with increasing speed and thus greater spacing from the upper dead center.

Figure 3:
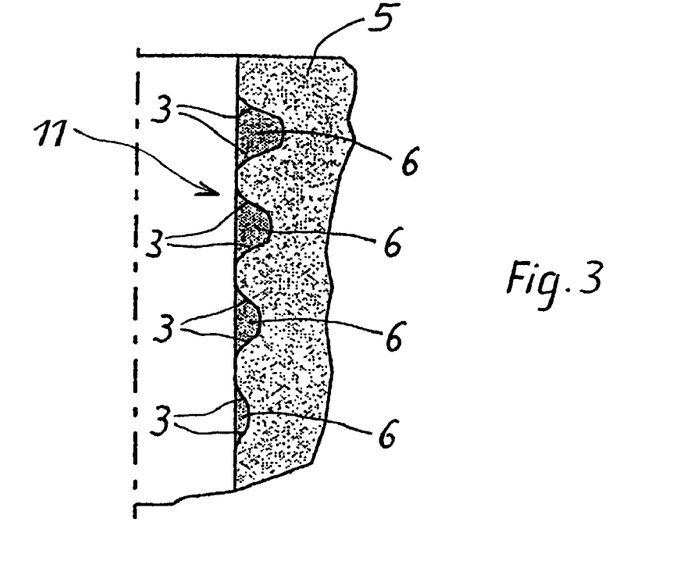
FIG. 3 shows an arrangement of pockets with different depths.

An example for graduation of the pockets 6 relative to their depth is illustrated in FIG. 3. It can be seen that in the upper area the pockets 6 have a substantially greater depth and can thus receive a significantly greater oil volume. With increasing spacing from the upper dead center, the depth of the pockets 6 is reduced because a smaller oil volume is sufficient for the hydrodynamic pressure with increasing speed of the piston.

Figure 4:
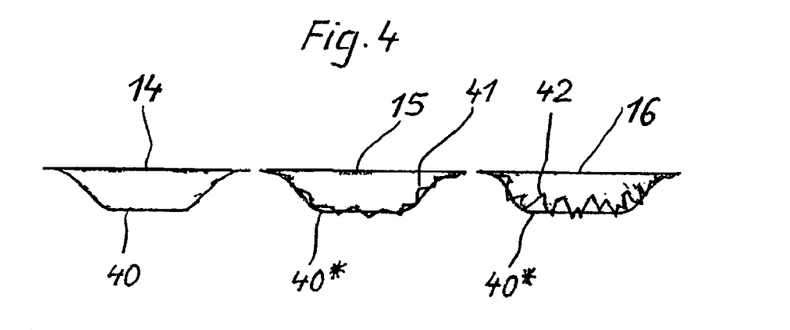
FIG. 4 shows different degrees of roughness of pockets.

In FIG. 4, pockets 14, 15, 16 with different roughness are illustrated. While the pocket 14 has a relatively smooth contour 40, the pocket 15 is provided with a rough surface 41 wherein an average course 40* of the contour corresponds again to that of the pocket 14. Even for greater roughness of the surface 42 of the pocket 16, a similar average course 40* results. The surface roughness of bottom and walls of the pockets 14, 15, 16 determines the contact surface relative to the oil film. In this way, adhesion can also be influenced, i.e., a rough surface enables an increasing lubricant film adhesion. This property is used in order to avoid a relative movement between the solid body and the lubricant film so that the relative movement is carried out only in the oil film by displacement of the liquid particles.

Figure 5A:
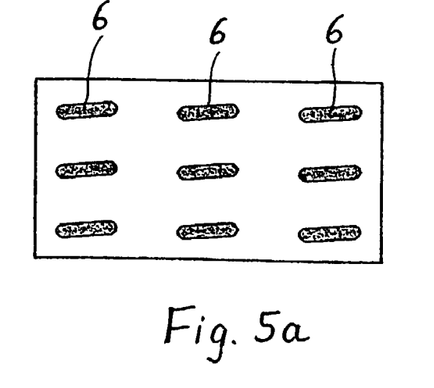
FIG. 5a shows a structure comprised of a first arrangement of identical pocket shapes.
Figure 5B:
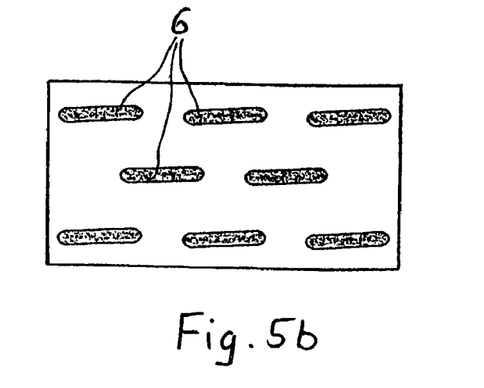
FIG. 5b shows a structure comprised of a second arrangement of identical pocket shapes.

FIGS. 5a, 5b shows two different types of arrangements of elongate pockets 6 wherein in the left illustration FIG. 5a the pockets are aligned relative to one another in two sequential planes, respectively, and in the illustration FIG. 5b to the right the pockets 6 are staggered in two sequential planes relative to one another. In this way, the pockets of the next plane are aligned with the gaps between two pockets 6 of the preceding plane. With the geometric positioning of the pockets 6 it can be determined whether the lubricant gap can take on exclusively the lubrication function or also a sealing function. The adjacently arranged pockets enable a lubricant film within the area of a pocket row, respectively, while the generation of a lubricant film is not favored in the area between the pockets. The lubricant film filling the gap is produced only in the area of the pockets. If, in addition to the lubricating action, a sealing function is also desired, the pockets should be arranged staggered relative to one another as illustrated in FIG. 5b. This arrangement provides an uninterrupted lubricant film and thus also the possibility of a sealing action. The arrangement of the pockets 6 itself can be parallel to the sliding surface edge or at a slant thereto. The incline can be 2 mm relative to the circumference of a cylinder. With a slightly inclined arrangement of the pockets 6 it is achieved that the piston ring edges, when passing the longitudinal edges of the pockets 6, momentarily pass only a point of the longitudinal edge. Preferably, this incline angle a has a size of <1°, wherein a range of 0.1° to 0.7° for this incline angle α is viewed as particularly suitable.

Figure 6:
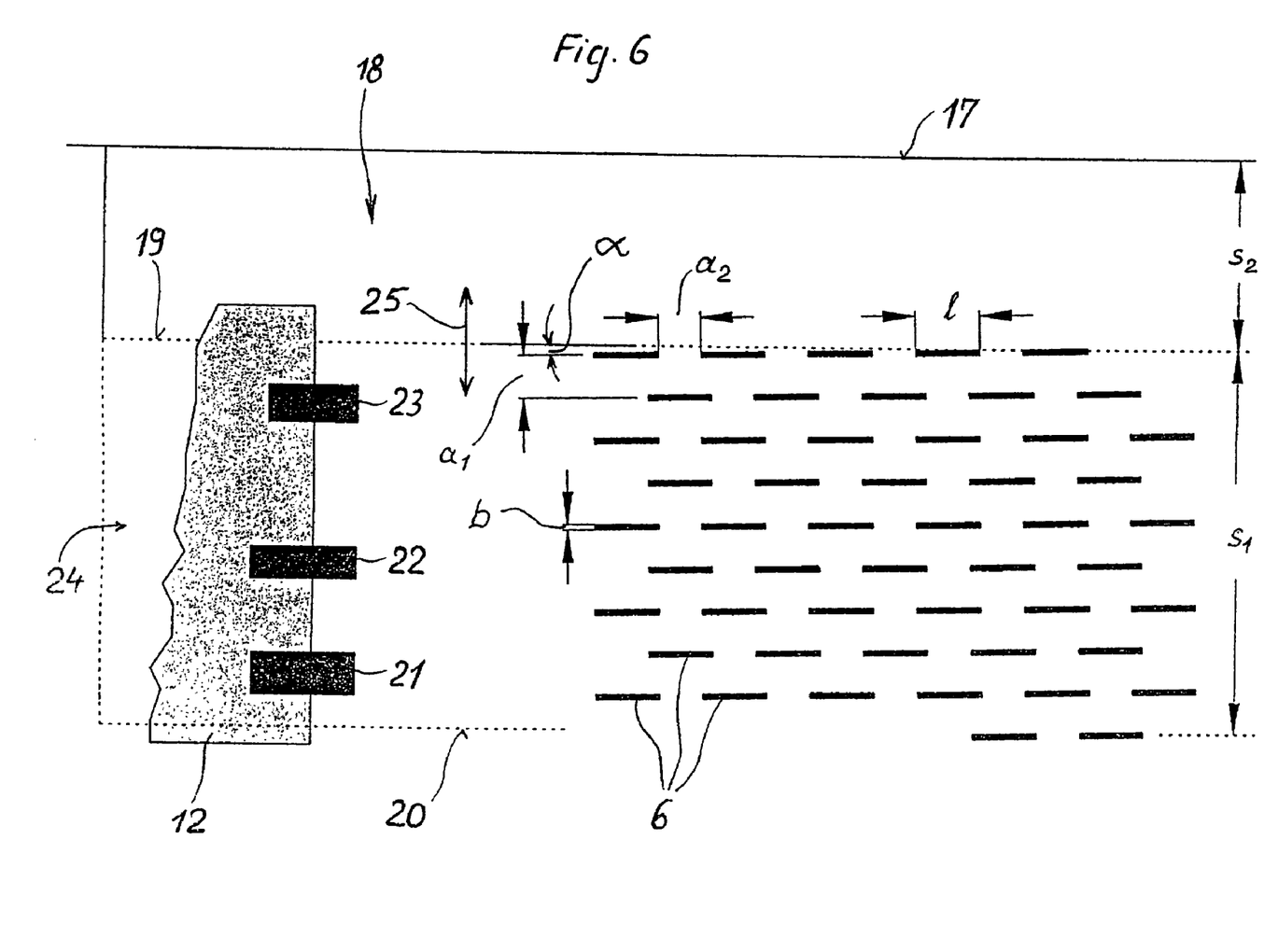
FIG. 6 is a schematic illustration of the upper dead center area at the upper dead center of a piston within a cylinder.

In FIG. 6, a schematic illustration of the cylinder bore 18 is illustrated whose upper end is identified at 17. This cylinder bore 18 forms the combustion chamber of an internal combustion engine. The lines 19 and 20 indicate the boundary of an upper dead center area 24 defined therebetween in which the piston 12 reaches its upper dead center. The position of the piston 12 illustrated in FIG. 6 corresponds to this upper dead center. The piston 12 is provided with a ring arrangement comprised of three piston rings 21, 22, 23. In the upper dead center area 24 a texturing comprised of a plurality of pockets 6 is provided which have an longitudinal extension. Their longitudinal axis is oriented substantially transverse to the movement direction 25 of the piston 12.

The pockets 6 are arranged in a regular pattern defining the texturing of the sliding surface. The pockets 6 are arranged in several vertically stacked planes relative to one another. As is shown clearly in FIG. 6, the pockets 6 of two sequential planes are arranged staggered relative to one another so that a spacing $a_2$ between two neighboring pockets 6 is covered by a pocket 6 of the next plane. The spacing between two planes of pockets 6 is identified at $a_1$. The spacings $a_1$ and $a_2$ are identical in the illustrated embodiment and can be approximately 2 mm. The pockets 6 have a length l and a width b. The length l can be, for example, 3 mm and the width b be can be, for example, in the range of 40 μm to 60 μm. The spacing $s_1$ of the lines 19 and 20 limiting the upper dead center area 24 is, for example, 18 mm and the spacing $s_2$ of the upper dead center area 24 from the upper edge 17 of the cylinder bore 18 is approximately 9 mm. As is clearly shown in FIG. 6, the planes of the pockets 6 extend at a slant to the orthogonal line relative to the movement direction 25 of the piston 12; the incline angle is identified at α. As already mentioned above, this incline angle α is less than 1°.

The hydrodynamic pressure between the sliding partners is generated by the relative movement. In areas with minimal relative speed of the sliding partners, pressure is built up by displacement.

In FIGS. 9 through 12 the conditions during pressure build-up upon displacement are schematically illustrated. In an internal combustion engine the minimal relative speed between piston ring and piston slide face or piston sliding surface is present in the area of the upper dead center. The pressure build-up by displacement in an internal combustion engine is realized by pressing the lubricant out of the gap between the piston slide face or piston sliding surface 11 and the piston ring 13. The displaced lubricant flows in the direction of the arrows 44 illustrated in FIGS. 9 through 12. The lubricant is pressed out of the gap by the radially widening piston ring 13, 38, which approaches the piston slide face or piston sliding surface 11 at a speed v, and by pressure loading as a result of ignition (combustion). The pressure loading results in a force F. For a fast displacement of the lubricant out of the gap, a mixed friction state or a depleted lubrication state can results. They can cause the so-called wear at upper dead center. This can be prevented with a corresponding geometric configuration of the sliding partners.

Figure 9:
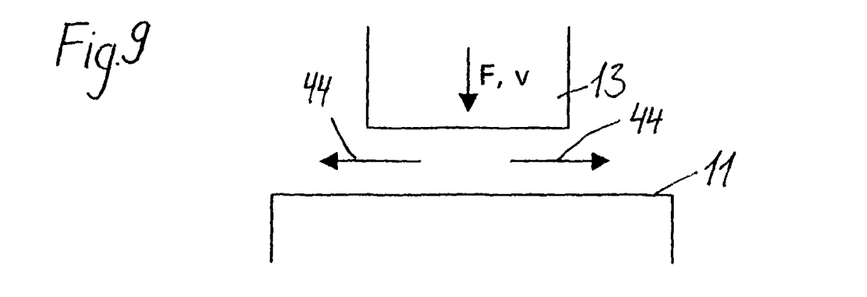
FIG. 9 shows in a schematic illustration pressure build-up by displacement for a first surface shape.

In FIG. 9 a piston ring 13 is illustrated which slides on a piston slide face or piston sliding surface 11 without pockets. When the piston ring 13 approaches at a speed v, the lubricant is pressed out of the gap in the direction of arrows 44.

Figures 10, 11:
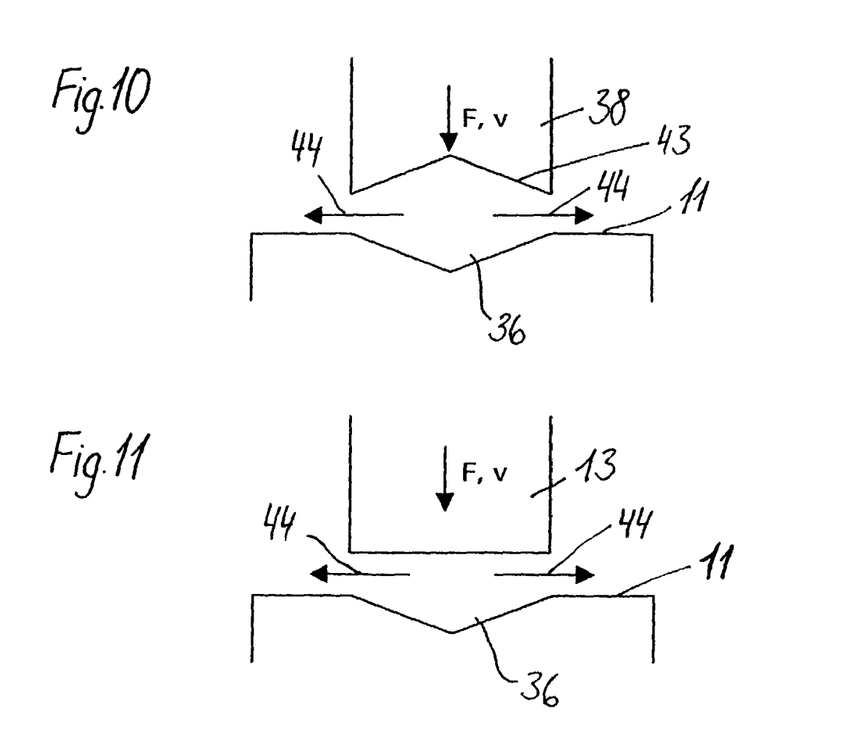
FIG. 10 shows in a schematic illustration pressure build-up by displacement for a second surface shape.
FIG. 11 shows in a schematic illustration pressure build-up by displacement for a third surface shape.

In comparison, a slowing of the lubricant displacement results in the configuration according to FIG. 10. A pocket 36 is provided within the piston slide face or piston sliding surface 11 which has slanted walls in the movement direction of the piston. The piston ring 38 has a V-groove 43 on its circumference which has slanted walls in the movement direction. The narrowing of the gap in the flow direction, indicated by the arrows 44, results in a pressure loss within the flow which effects a minimal volume flow out of the gap. The result of the narrowing of the gap in the flow direction causes the friction partners to float. The relative movement of the lubricant results in the generation of hydrodynamic pressure. This generates a higher counter pressure, and this causes the displacement to be slowed.

The piston slide face or piston sliding surface 11 illustrated in FIG. 11 has also a pocket 36 with slanted walls in the movement direction of the piston. The piston ring 13 is however plane at its outer side facing the piston slide face or piston sliding surface 11. In this configuration, a volume flow results in the direction of the arrows 44 which is smaller than that in the configuration according to FIG. 9 but greater than that in the configuration according to FIG. 10.

Figure 12:
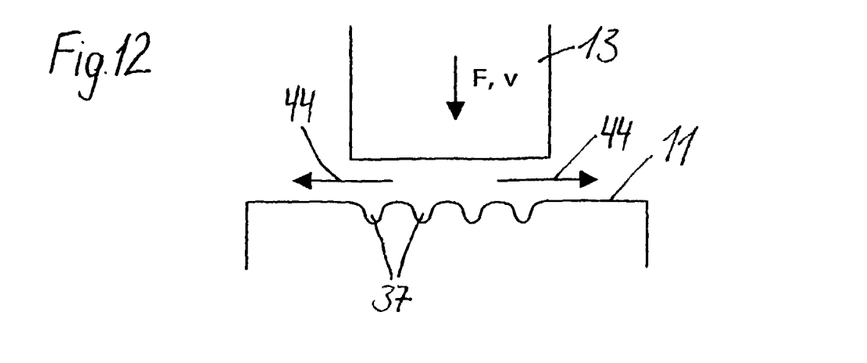
FIG. 12 shows in a schematic illustration pressure build-up by displacement for a fourth surface shape.

In FIG. 12 a piston slide face or piston sliding surface 11 with several pockets 37 is illustrated. The pockets 37 are concave and have a rounded peripheral rim. The lubricant volume flow which is generated upon movement of the piston ring 13 at the speed v and the force F in the direction of the arrows 44 is smaller than the volume flow which results in the configuration according to FIG. 9.

Figure 7:
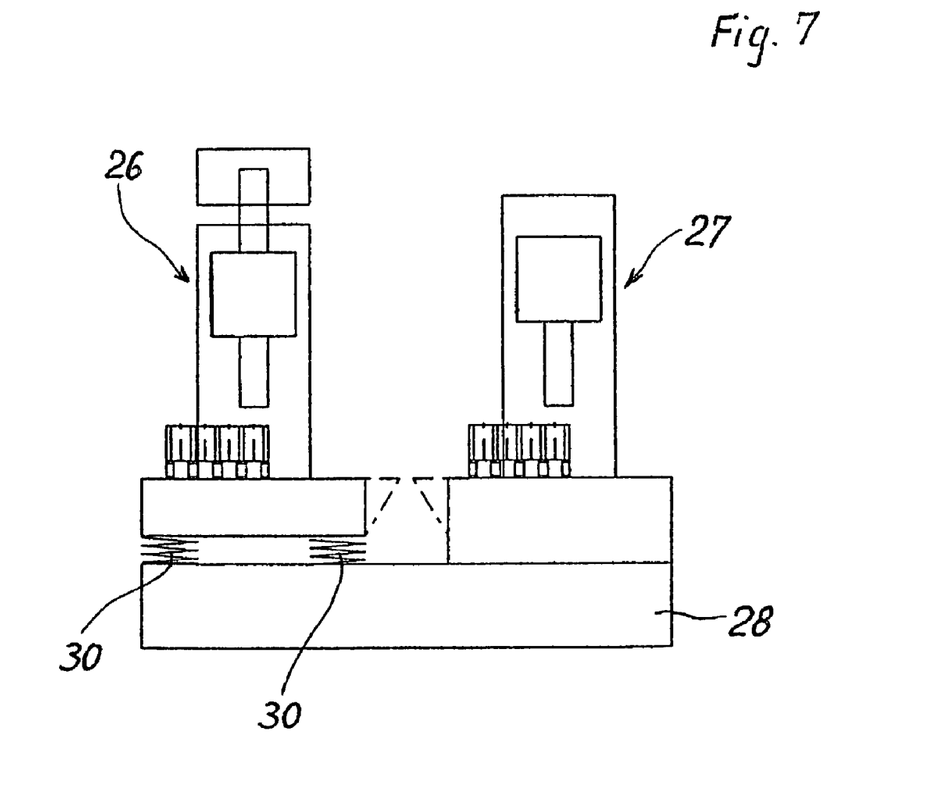
FIG. 7 is a schematic illustration of a machine tool with two processing stages.

FIG. 7 shows an embodiment of a machine tool for the processing steps of texturing and the subsequent finish treatment. For the process of texturing, a laser station 26 is provided and for fine-machining, i.e., deburring and smoothing, a honing station 27 is provided. The laser station 26 and the honing station 27 are arranged on a common machine frame 28. While the honing station 27 is arranged with its working table directly on the machine frame 28, the laser station 26 is supported by vibration-decoupling means 30 on the machine frame 28. These vibration-decoupling means between the laser station 26 and the machine frame 28 can be realized by mechanical or pneumatic damping elements. The laser station 26 operates as a unit rigid within itself which is vibration-decoupled from the machine frame 28. In this way, it is achieved that the laser beam maintains an absolute position relative to the surface to be machined. The positional precision of the laser beam can produce exactly the desired structuring or texturing of the surface.

The laser station 26 is known with regard to its configuration and comprises a conventional radiation or beam source within beam guiding means having the required optical components for this purpose.

Figure 8:
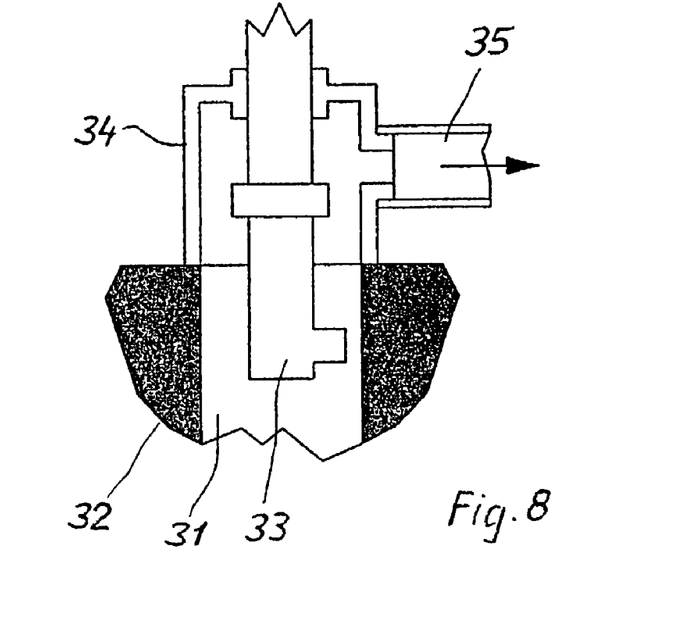
FIG. 8 is a schematic illustration of a laser device in a bore to be machined.

FIG. 8 shows a laser head 33 arranged in the bore 31 of a workpiece 32. Above the upper end of the bore 31 a suction bell 34 is provided to which is connected a suction tube 35. During laser machining, the bore 31 is subjected to a vacuum by means of the suction or vacuum pipe 35 and the bell 34 so that the particles which are removed by laser machining from the cylinder wall can be removed by suction. Particle deposition on the laser head 33 is reduced in this way.

While specific embodiments of the invention have been shown and described in detail to illustrate the inventive principles, it will be understood that the invention may be embodied otherwise without departing from such principles.

What is claimed is:

1. A method for producing a piston slide face (11, 18) in a cylinder, the method comprising the steps of:
   pre-treating a surface of the cylinder where the piston slide face is to be produced;
   structuring by laser treatment the surface by generating pockets in a tribologically loaded top dead center area where the piston is located when at top dead center;
   fine-machining in two stages, wherein
      in a first stage, fused projections produced on the structure edges of the pockets by laser treatment are removed by deburring with deburring stones having a length corresponding to a length of the top dead center area; and
      in a second stage, a functional roughness is produced by finish-machining selected from honing, polishing or grinding on supporting areas located between the pockets.

2. The method according to claim 1, wherein deburring is performed with a preset duration or based on a number of stroke movements.

3. The method according to claim 1, wherein deburring and finish-machining tools are arranged on a common spindle so that deburring and finish-machining are carried out by the same spindle.

4. The method according to claim 1, wherein deburring is carried out by a deburring stone arranged on a first spindle that is separate from a second spindle for finish-machining wherein deburring is carried out at low feed pressure.

5. The method according to claim 1, wherein deburring is carried out with deburring stones having a defined cutting geometry.

6. The method according to claim 1, wherein finish-machining is carried out with a tool having individual honing sections that are supported independently from one another in a springy fashion so as to adapt to the waviness of the surface to be machined after having been structured and deburred.

7. The method according to claim 1, wherein the functional roughness produced to have peaks and valleys having a depth range greater than 0 micrometer and not more than 5 micrometer.

* * * * *